US005762235A

United States Patent [19]
Coughlin

[11] Patent Number: 5,762,235
[45] Date of Patent: Jun. 9, 1998

[54] MEDICAMENT VERIFICATION IN AN AUTOMATIC DISPENSING SYSTEM

[75] Inventor: Michael E. Coughlin, Overland Park, Kans.

[73] Assignee: ScriptPro, L.L.C., Shawnee Mission, Kans.

[21] Appl. No.: 906,025

[22] Filed: Aug. 5, 1997

Related U.S. Application Data

[63] Continuation of Ser. No. 613,852, Mar. 11, 1996, Pat. No. 5,713,487.
[51] Int. Cl.⁶ .................................................. G07F 11/00
[52] U.S. Cl. .................................................. 221/6; 221/131
[58] Field of Search .......................... 221/2, 7, 13, 127, 221/9, 124, 131, 6

[56] References Cited

U.S. PATENT DOCUMENTS 5,337,919  8/1994  Spaulding et al. ............... 221/2
5,562,232  10/1996  Pearson ............................ 221/7

*Primary Examiner*—Kenneth Noland
*Attorney, Agent, or Firm*—Hovey, Williams, Timmons & Collins

[57] ABSTRACT

A system for dispensing medicaments such as pills and capsules includes a plurality of medicament dispensing cells, a manipulator arm for moving to a cell and receiving medicament dispensed therefrom into a vial, and a controller for controlling the operation of the manipulator arm. In one embodiment of the invention, each cell includes indicia thereon such as a bar code indicating the medicament contained therein and the system includes an indicia reader such as a bar code reader attached to the manipulator arm. When the system receives dispensing instructions such as a prescription to be filled, the controller moves the manipulator arm to a selected cell location of a cell having the medicament to be dispensed, as indicated by cell data included in the controller memory. The indicia reader reads the indicia on the cell at the selected location and the controller determines whether the medicament indicated by the indicia matches the medicament of the prescription. If there is a match, the medicament is deemed verified and dispensing proceeds. If there is no match, the controller prevents dispensing of medicament from the selected cell.

3 Claims, 2 Drawing Sheets

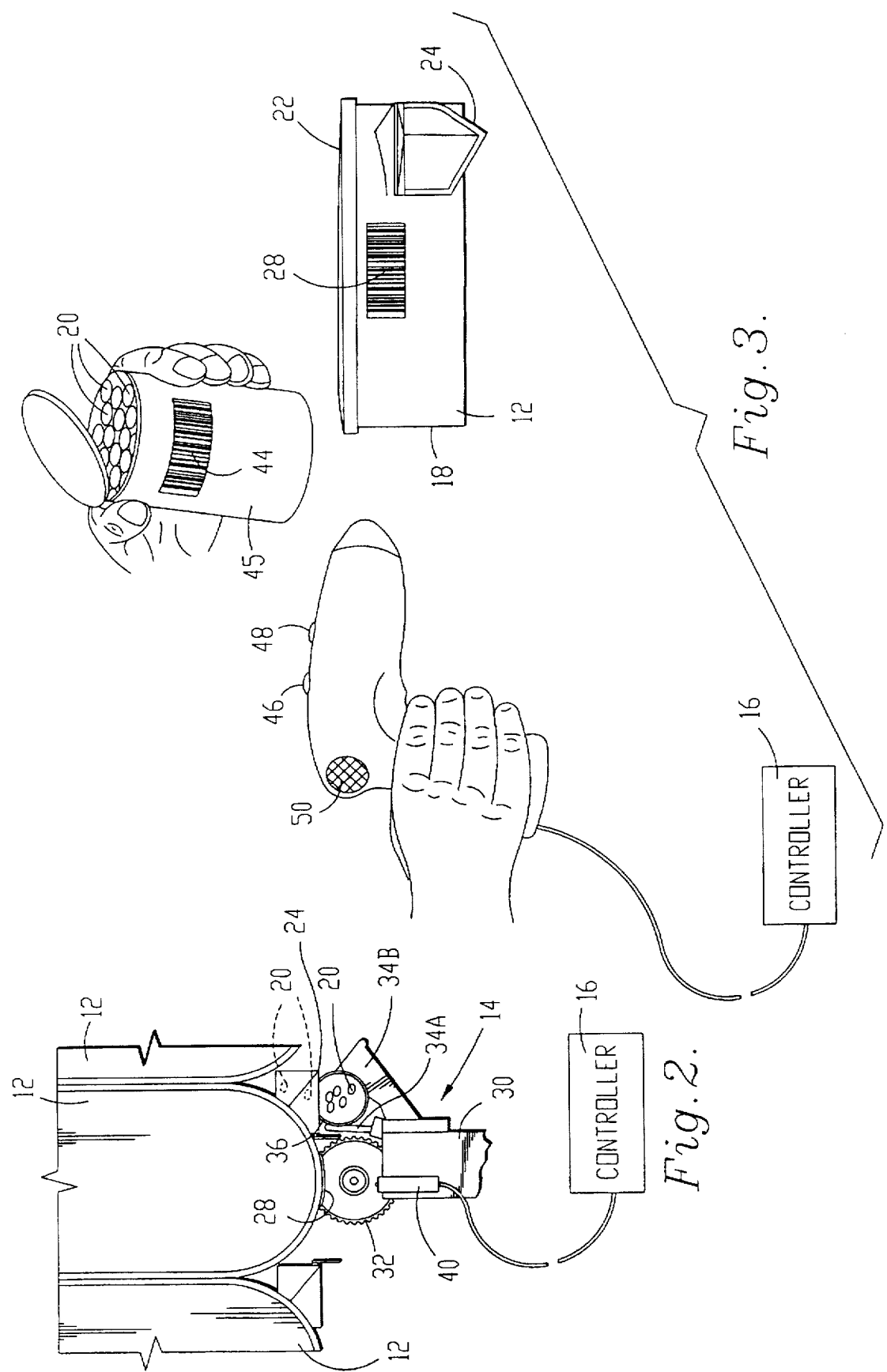

MEDICAMENT VERIFICATION IN AN AUTOMATIC DISPENSING SYSTEM

This application is a continuation of application Ser. No. 08/613,852, filed on Mar. 11, 1996 now U.S. Pat. No. 5,713,487.

BACKGROUND OF THE INVENTION

1. Field of the Invention

The present invention relates to the field of systems for automatically dispensing medicaments such as prescription drugs in the form of pills and capsules. More particularly, the invention is concerned with a system for verifying that the medicament dispensed from a dispensing cell matches the prescribed medicament.

2. Description of the Prior Art

An automatic medicament dispensing system, such as that disclosed in U.S. Pat. No. 5,337,919, includes a plurality of medicament dispensing cells containing respective medicaments. The '919 system includes memory associated with the controller for storing cell data including the location of each cell and the medicament assigned to the cell at that location. In operation, the system controller receives instructions for a prescription including the medicament to be dispensed and the quantity. The controller then moves a manipulator arm to the appropriate cell as indicated by the cell data for receiving medicament therefrom into a vial, which is then delivered to an off-loading station.

A serious problem can develop, however, if the cell data is incorrect or the locations of the various cells have been changed. This might occur, for example, if an attendant removes more than one cell at a time for replenishment and does not replace these cells to the same locations. In such a situation, the controller would move the manipulator arm to the cell location corresponding to the cell data for the prescribed medicament. The cell at this location, however, would not contain the medicament as indicated by the cell data. As a result, the wrong medicament could be dispensed leading to potentially serious problems for the patient.

Another potential problem can occur during replenishment of the cells. Specifically, an attendant could fill a cell with the wrong medicament, again leading to the possibility of a patient receiving the wrong medicament.

SUMMARY OF THE INVENTION

The present invention solves the prior art problems discussed above and provides a distinct advance in the state of the art. More particularly, the verification system hereof verifies that a dispensing cell for a particular medicament is in the correct location before medicament is dispensed and verifies that cells are replenished with the correct medicament.

In the preferred embodiment of the invention, each cell in the dispensing system includes indicia thereon, such as bar coding, corresponding to the medicament contained therein. An indicia reader such as a bar code reader is attached to the manipulator arm and reads the cell indicia when the controller moves the arm to a selected cell location. The controller then determines whether there is a match between the medicament as indicated by the cell indicia and the medicament as indicated by the dispensing instructions, thereby verifying the correct medicament. If a match is indicated, medicament dispensing proceeds, but if a mismatch is indicated, dispensing is prevented.

In another embodiment, a hand-held indicia reader coupled with the controller is used during replenishment. Each container of new medicament includes indicia indicating the medicament contained therein. The attendant uses the reader to read the container indicia and also to read the indicia on a cell to be replenished. If the controller determines that there is a match between the medicaments as indicated by the container and cell indicia, then a signal is provided to the attendant indicating allowance to proceed with replenishment. If a mismatch is determined, the controller provides a mismatch signal indicating to the attendant that replenishment is disallowed. Other preferred aspects of the present invention are disclosed herein.

BRIEF DESCRIPTION OF THE DRAWINGS

FIG. 2 is a partial plan view of medicament dispensing cell and manipulator arm of the apparatus of FIG. 1 showing the controller in block diagram form; and FIG. 3 is a schematic representation of a dispensing cell, a container of medicament, and a bar code reader coupled with the controller being used for replenishing a dispensing cell of FIG. 1.

DETAILED DESCRIPTION OF THE PREFERRED EMBODIMENT

Figure 1:
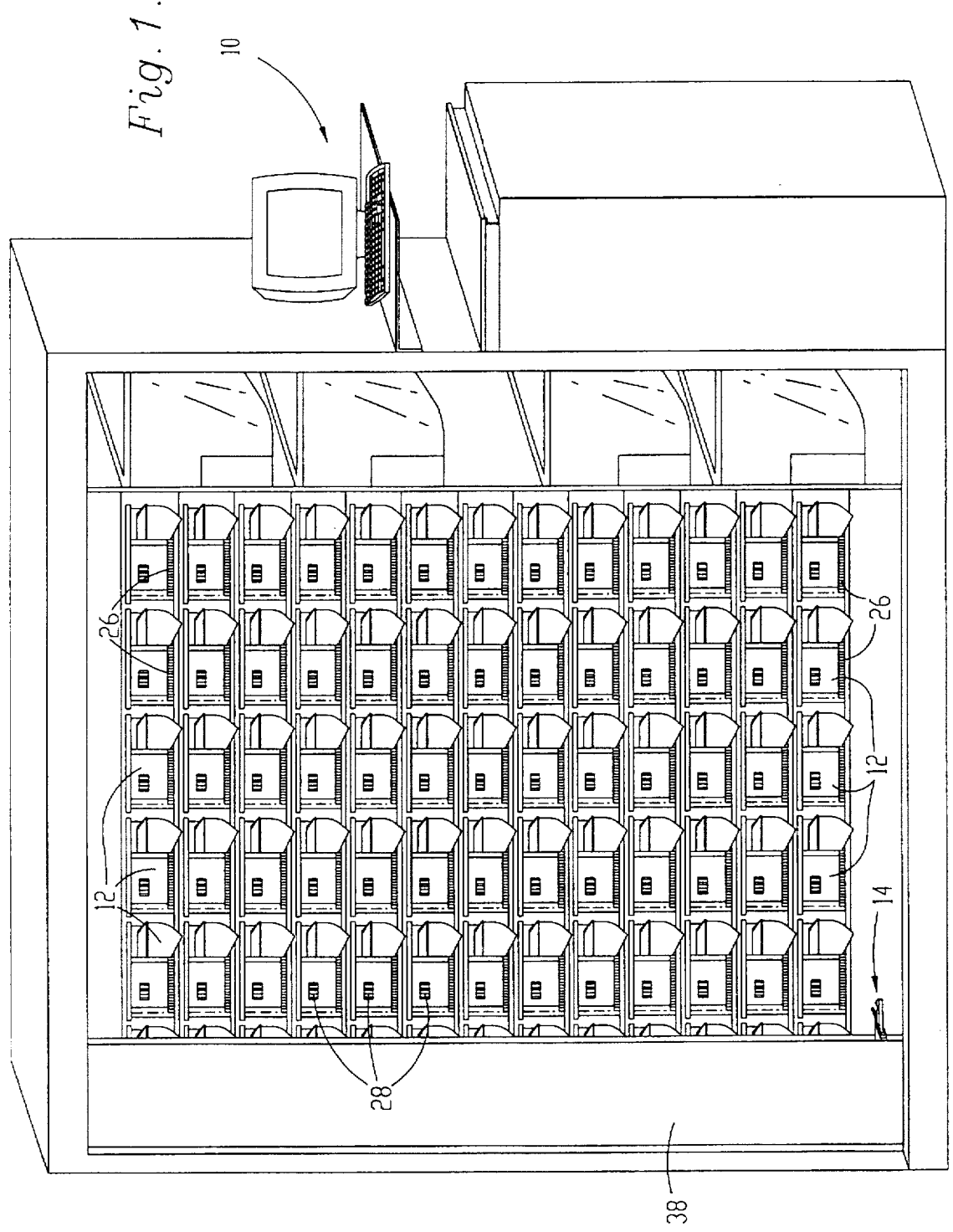
FIG. 1 is a right perspective view of the preferred apparatus in accordance with the present invention.

Referring to the drawing figures, apparatus 10 includes a plurality of medicament dispensing cells 12, vial manipulator assembly 14 and system controller 16 (FIGS. 2 and 3). Apparatus 10 is preferably modified as explained herein from the dispensing system as disclosed in U.S. Pat. No. 5,337,919, hereby incorporated by reference.

Each dispensing cell 12 includes housing 18 containing medicament 20 such as pills or capsules, removable lid 22, outlet port 24, driven dispenser gear 26 (FIG. 1) and indicia 28, preferably in the form of a machine-readable bar code corresponding to the medicament contained in the cell 12.

Manipulator assembly 14 includes manipulator arm 30, drive gear 32, gripper fingers 34a and 34b for holding vial 36, shifting mechanism 38 (FIG. 1) under the control of controller 16 for moving arm 30 to a selected cell location, and indicia reader 40 preferably in the form of conventional bar code reader mounted to arm 30 and coupled with controller 16. Reader 40 is operable to produce indicia signals representative of indicia 28 and thereby representative of the medicament contained in the corresponding cell.

Controller 16 is microprocessor-based under program control and includes an associated memory for storing cell data. This data includes the locations of dispensing cells 12 and the medicament assigned to the cells at these locations.

In operation, controller 16 receives dispensing instructions such as prescription data from a pharmacy host computer. The dispensing instructions include the medicament to be dispensed and quantity thereof. In response to the instructions, controller 16 accesses the memory for the cell data and determines a selected cell location corresponding to the medicament indicated in the dispensing instructions. Controller 16 then activates mechanism 38 to move manipulator assembly 14 and thereby manipulator arm 30 to retrieve vial 36 between gripper fingers 34a, 34b from a supply thereof, and then to move arm 30 to the selected cell location corresponding to a cell containing the medicament to be dispensed. At the selected cell location, fingers 34a, 34b position vial 36 at the outlet port 24 of a cell 12 for receiving medicament 20 therefrom.

As arm 30 reaches the selected cell location, indicia reader 40 scans cell indicia 28 and provides indicia signals representative thereof to controller 16. Controller 16 then compares the medicament as indicated by the indicia signals with the medicament to be dispensed as contained in the dispensing instructions. If the medicament so indicated match, controller 16 then activates drive gear 32 which in turn operates dispenser gear 26 causing medicament 20 to be dispensed from cell 12 through outlet port 24 into vial 36.

If the medicament as indicated by the indicia signals and dispensing instructions do not match, controller 16 prevents activation of gear 32 and thereby prevents dispensing of medicament into vial 36. Controller 16 also provides an output in response such as an alarm signal or instructions to the pharmacy host computer indicating that the prescription could not be filled and that a problem exists.

To minimize problem occurrences, controller 16 may be programmed to activate a checking procedure. During such a procedure, controller 16 would move manipulator arm and thereby indicia reader 40 to each cell location in turn, read the indicia on each cell, and compare the medicament for each cell as indicated by the indicia with the cell data stored memory. This checking procedure might be initiated once a day, for example, when there are no prescriptions waiting to be filled, which might typically occur late night or early morning. Additionally, the checking procedure might be initiated each time any cells are replenished with medicament as such times are the ones most likely for a mix-up in cell locations to occur.

FIG. 3 illustrates another embodiment of the invention for verifying medicaments during replenishments of cells 12. This embodiment uses a hand-held indicia reader 42 such as a bar code reader coupled with controller 16. Alternatively, reader 42 could be the type mounted to a table for reading bar codes at various orientations, such as the type used in supermarkets. Reader 42, like reader 40, is operable to read indicia 28 on cells 12 and is also operable to read container indicia 44 on container 45, typically in the form of a bar code present on containers of medicaments, and to provide corresponding cell and container indicia signals to controller 16. Reader 42 could include green lamp 46, red lamp 48 and speaker 50, all under the control of controller 16.

When a cell 12 needs to be replenished with medicament, an attendant secures a container 45 containing the needed medicament and removes the cell 12 needing replenishment from the framework of apparatus 10. The attendant passes indicia reader 40 over cell indicia 28 and over container indicia 44. As is typical with bar code readers, controller 16 may activate speaker 50 for a short beep each time a bar code is read to provide an indication to the attendant that the reading has been completed.

Upon receiving cell indicia signals and container indicia signals from reader 42, controller 16 determines whether the medicaments as indicated by these signals match. If yes, controller 16 activates green lamp 46 to provide a visual indication or some other indication to the attendant that a match is indicated and that it is allowable to proceed with removing cell lid 22 to replenish cell 12 with the medicament 20 from the container. After replenishment, the attendant replaces lid 22 and replaces cell 12 in apparatus 10.

If controller 16 determines that the two medicament indications do not match, controller 16 activates red lamp 48 as a visual signal or some other indication to the attendant that replenishment is not allowed. Additionally, controller 16 may activate speaker 50 with a specifically designed alarm tone to provide an audible indication to the attendant. Controller 16 may also store a record of these replenishment transactions.

As those skilled in the art will appreciate, the present invention encompasses many variations in the preferred embodiments described herein. For example, indicia may be used other than the preferred bar coding and the present invention finds utility in other types of medicament dispensing machines.

Having described the preferred embodiments in detail, the following is claimed as new and desired to be secured by Letters Patent:

1. In a medicament dispensing system including a plurality of medicament dispensing cells, a manipulator operable for moving to a selected cell for receiving medicament therefrom, and a controller for controlling the operation of the manipulator, a method of replenishing the cells with respective medicaments comprising the steps of:

(a) determining a selected cell for replenishment of medicament assigned thereto, each of the cells having machine-readable cell indicia thereon representative of the medicaments assigned thereto;

(b) selecting a container containing a medicament and having container indicia thereon representative of a medicament contained therein, the system including an indicia reader coupled with the controller, said indicia reader including means for reading said cell and container indicia, for producing indicia signals representative thereof and for delivering said indicia signals to said controller;

(c) using said indicia reader to read said cell and container indicia and to produce respective cell indicia signals and container indicia signals representative thereof; and (d) in the controller, receiving said cell indicia signals and container indicia signals and determining whether there is a match between medicaments represented thereby;

(e) if there is a lack of a match between medicaments represented by said cell indicia signals and container indicia signals, providing a mismatch output detectable by an attendant indicating that replenishment of medicament from said container is disallowed and, if there is a match between medicaments represented by said cell indicia signals and container indicia signals, producing a match output detectable by an attendant indicating that replenishment of said selected cell by medicament from said container is allowed.

2. The method as set forth in claim 1, said indicia including bar codes, said reader including a bar code reader, step (c) including the step of using said indicia reader to read said cell and container bar codes.

3. The method as set forth in claim 1, said medicaments including prescription drugs.

* * * * *